(12) United States Patent
Dong

(10) Patent No.: US 11,457,051 B2
(45) Date of Patent: Sep. 27, 2022

(54) STREAMING MEDIA DATA PROCESSING METHOD, PROCESSING SYSTEM AND STORAGE SERVER

(71) Applicant: BOE Technology Group Co., Ltd., Beijing (CN)

(72) Inventor: Chaofeng Dong, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/409,572

(22) Filed: Aug. 23, 2021

(65) Prior Publication Data

US 2022/0141273 A1 May 5, 2022

(30) Foreign Application Priority Data

Oct. 29, 2020 (CN) .......................... 202011182685.8

(51) Int. Cl.
*H04L 65/61* (2022.01)
*H04L 67/568* (2022.01)

(52) U.S. Cl.
CPC ............ *H04L 65/61* (2022.05); *H04L 67/568* (2022.05)

(58) Field of Classification Search
CPC ........ H04L 65/00–65/80; H04L 67/56–67/568
See application file for complete search history.

(56) References Cited

U.S. PATENT DOCUMENTS

| 7,099,953 | B2 * | 8/2006 | Horiuchi | H04L 9/40 |
| | | | | 725/86 |
| 9,639,629 | B1 * | 5/2017 | Venkat | H04L 67/5681 |
| 2017/0171585 | A1 | 6/2017 | Chen | |
| 2018/0241836 | A1 * | 8/2018 | Arsenault | H04L 67/5681 |
| 2019/0109896 | A1 * | 4/2019 | Crowder | H04L 67/1021 |

FOREIGN PATENT DOCUMENTS

| CN | 107707966 A | 2/2018 |
| CN | 110213652 A | 9/2019 |
| CN | 110868600 A | 3/2020 |
| CN | 111565168 A | 8/2020 |

OTHER PUBLICATIONS

CN 202011182685.8 first office action.

* cited by examiner

*Primary Examiner* — Clayton R Williams
(74) *Attorney, Agent, or Firm* — IPro, PLLC

(57) ABSTRACT

The present application discloses a streaming media data processing method, including: receiving streaming media data, initializing a storage file and a storage queue according to a header data packet of the streaming media data, and starting a first thread to receive an enqueuing operation; starting a second thread and establishing a message channel to read a streaming media data packet from the storage queue for parsing, and adding the parsed streaming media data packet into the message channel in the form of a message; starting a third thread to read the message from the message channel and encapsulating the message according to preset requirements so as to store the message on a disk; determining a target pull server corresponding to the streaming media data and publishing the streaming media data to the target pull server.

20 Claims, 6 Drawing Sheets

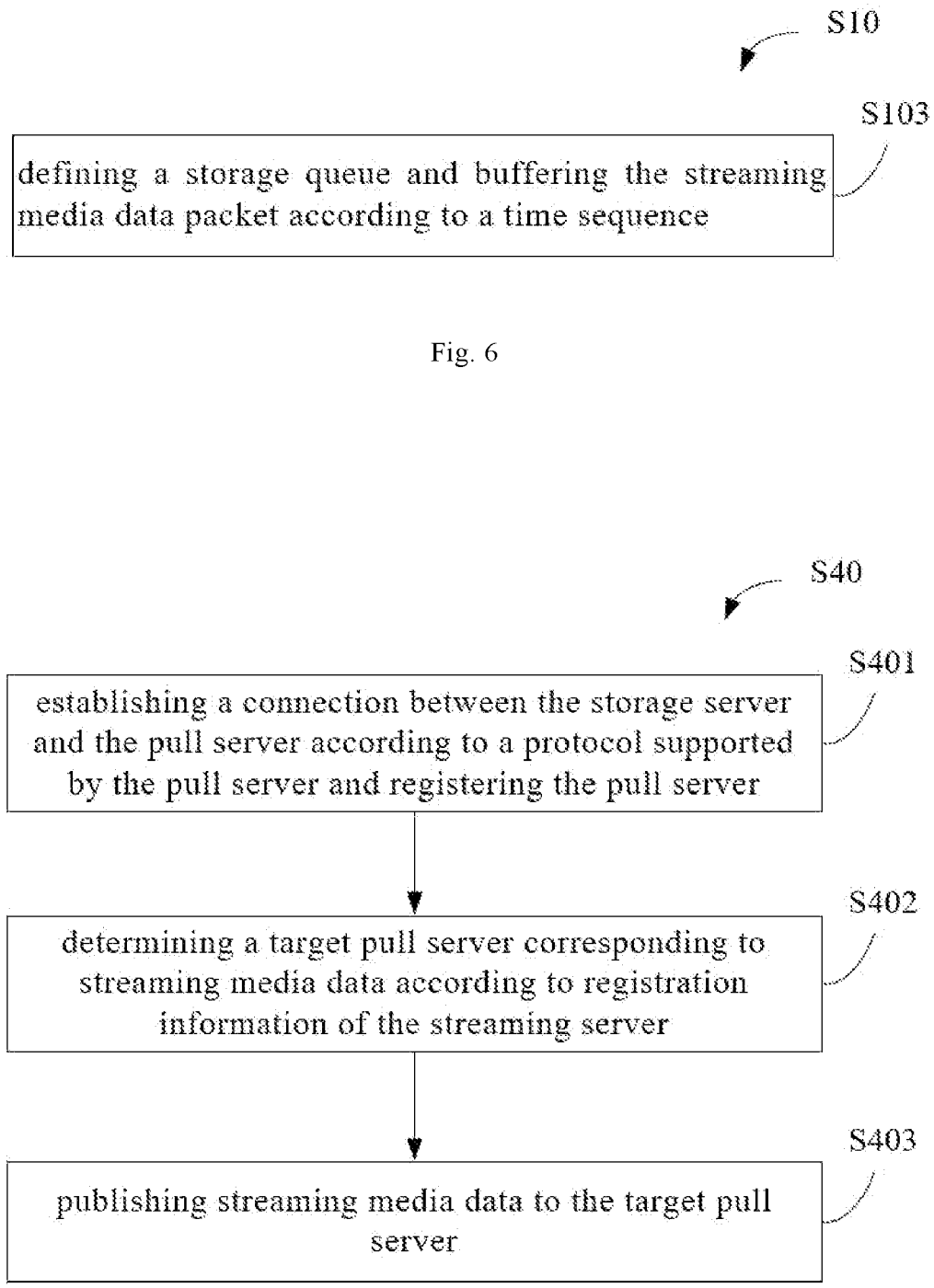

STREAMING MEDIA DATA PROCESSING METHOD, PROCESSING SYSTEM AND STORAGE SERVER

CROSS-REFERENCE TO RELATED APPLICATIONS

The present application claims priority to Chinese Patent Application No. 202011182685.8 filed in China on Oct. 29, 2020 which is incorporated herein by reference in its entirety.

TECHNICAL FIELD

The present application relates to the technical field of streaming media, and in particular to a streaming media data processing method, a streaming media data processing system, a storage server and a readable storage medium.

BACKGROUND

The development of Internet technology has brought great convenience to people's life. For example, people can use streaming media technology to view live video and on-demand video, and cache the video while watching, thereby saving the waiting time for watching the video. In the related art, data dropping is realized by adding a dropping function in a cache server, or a special file system is configured, so as to ensure that each server can efficiently store or read streaming media data. However, adding a function in the cache server or configuring a special system may affect stability of a streaming media data processing system, which affects storage and reading efficiency of the streaming media data and results in poor video playing effect and poor user experience.

SUMMARY

In view of the above, embodiments of the present application provide a streaming media data processing method, a streaming media data processing system, a storage server and a readable storage medium.

The present application provides a streaming media data processing method, and the processing method includes:

receiving streaming media data, initializing a storage file and a storage queue according to a header data packet of the streaming media data, and starting a first thread to receive an enqueuing operation;

starting a second thread and establishing a message channel so as to read a streaming media data packet from the storage queue for parsing, and adding the parsed streaming media data packet into the message channel in the form of a message;

starting a third thread to read the message from the message channel and encapsulating the message according to preset requirements so as to store the message on a disk; and determining a target pull server corresponding to the streaming media data and publishing the streaming media data to the target pull server.

In some embodiment, the receiving streaming media data, initializing a storage file and a storage queue according to a header data packet of the streaming media data, and starting a first thread to receive an enqueuing operation, includes:

receiving configuration information and configuring a cache server so as to establish a connection between a storage server and the cache server; and monitoring the connection between the storage server and the cache server to obtain the streaming media data.

In some embodiments, the configuration information includes: address, protocol type, and key.

In some embodiment, the receiving streaming media data, initializing a storage file and a storage queue according to a header data packet of the streaming media data, and starting a first thread to receive an enqueuing operation, includes:

defining the storage queue and buffering the streaming media data packets according to a time sequence; the storage queue supporting enqueuing and dequeuing operations; the streaming media data packet including a packet sequence number, a time stamp and a data load; the header data packet including stream description information.

In some embodiment, the determining a target pull server corresponding to the streaming media data and publishing the streaming media data to the target pull server, includes:

establishing a connection between the storage server and a pull server according to a protocol supported by the pull server and registering the pull server;

determining the target streaming server corresponding to the streaming media data according to registration information about of the pull server; and publishing the streaming media data to the target pull server.

In some embodiment, the establishing a connection between the storage server and the pull server according to a protocol supported by the pull server and registering the pull server, includes:

receiving a subscription message of the pull server so as to establish a connection between the storage server and the pull server; and sending a publication message to the pull server for a user to query the streaming media data.

In some embodiment, the subscription message and/or the publication message are sent as an object profile string via a transmission control protocol, wherein the subscription message includes a streaming media resource identification number, a streaming media protocol, a streaming media name and a time stamp, and the publication message includes the streaming media resource identification number, the streaming media protocol, the streaming media name, the time stamp, the packet sequence number of the streaming media data packet and a streaming media data load.

The present application provides a storage server, and the storage server includes:

a receiving circuit configured to receive streaming media data, initialize a storage file and a storage queue according to a header data packet of the streaming media data, and start a first thread to receive an enqueuing operation;

a parsing circuit configured to start a second thread and establish a message channel so as to read a streaming media data packet from the storage queue for parsing, and add the parsed streaming media data packet into the message channel in the form of a message;

a storage circuit configured to start a third thread to read the message from the message channel and encapsulate the message according to preset requirements so as to store the message on a disk; and a publishing circuit configured to determine a target pull server corresponding to the streaming media data and publish the streaming media data to the target pull server.

The present application provides a streaming media data processing system, and the streaming media data processing system includes one or more processors and a memory, the memory storing a computer program, the computer program is executed by the processors to implement the steps of the streaming media data processing method of any of the above embodiments.

The present application provides a non-transitory computer readable storage medium storing a computer program, wherein the computer program is executed by one or more processors to implement the steps of the streaming media data processing method of any of the above embodiments.

In the streaming media data processing method, the streaming media data processing system, the storage server and the readable storage medium of the embodiments of the present application, a streaming media data packet is stored via a storage queue, and the streaming media data packet is dropped via a message channel, which can ensure that the streaming media data is stored and read at a higher speed, and when a streaming media file is played, a smoother and clearer playing effect is achieved, so as to improve user experience.

BRIEF DESCRIPTION OF THE DRAWINGS

The foregoing and/or additional aspects and advantages of the present application will become apparent and readily appreciated from the following description of embodiments in conjunction with the accompanying drawings.

FIG. 6 is a flow diagram of a streaming media data processing method according to some embodiments of the present application.

FIG. 7 is a flow diagram of a streaming media data processing method according to some embodiments of the present application.

DETAILED DESCRIPTION

Figure 1:
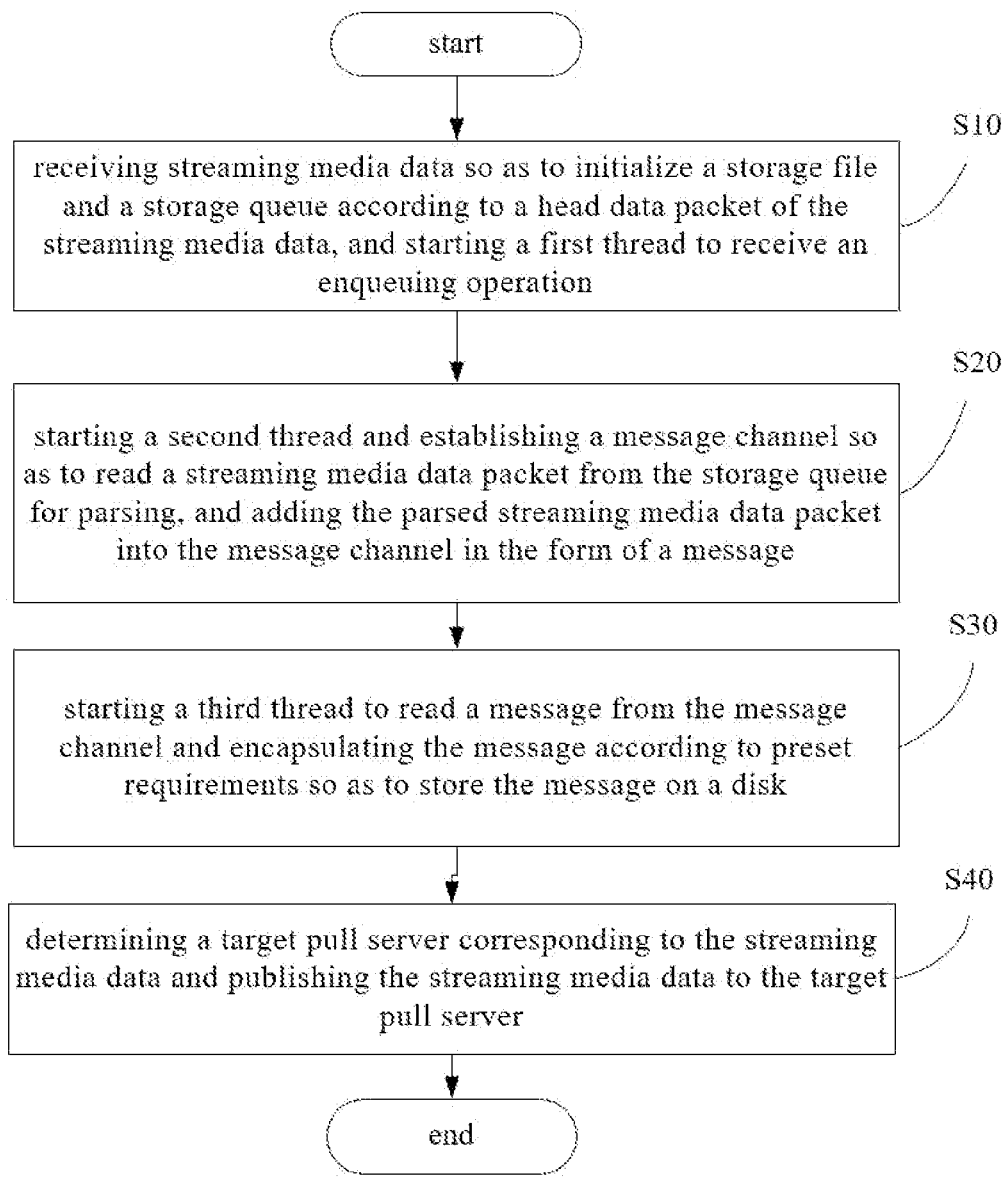
FIG. 1 is a flow diagram of a streaming media data processing method according to some embodiments of the present application.

Embodiments of the present application will be described in detail below, examples of the embodiments are illustrated in the accompanying drawings, where the same or similar reference numerals refer to the same or similar parts or parts having the same or similar functions throughout. The embodiments described below with reference to the accompanying drawings are exemplary and are intended to explain the present application and are not to be construed as limiting the present application.

With reference to FIG. 1, the present application provides a streaming media data processing method, including the following steps:

S10: receiving streaming media data so as to initialize a storage file and a storage queue according to a header data packet of the streaming media data, and starting a first thread to receive an enqueuing operation;

S20: starting a second thread and establishing a message channel so as to read a streaming media data packet from the storage queue for parsing, and adding the parsed streaming media data packet into the message channel in the form of a message;

S30: starting a third thread to read a message from the message channel and encapsulating the message according to preset requirements so as to store the message on a disk; and S40: determining a target pull server corresponding to the streaming media data and publishing the streaming media data to the target pull server.

Figure 2:
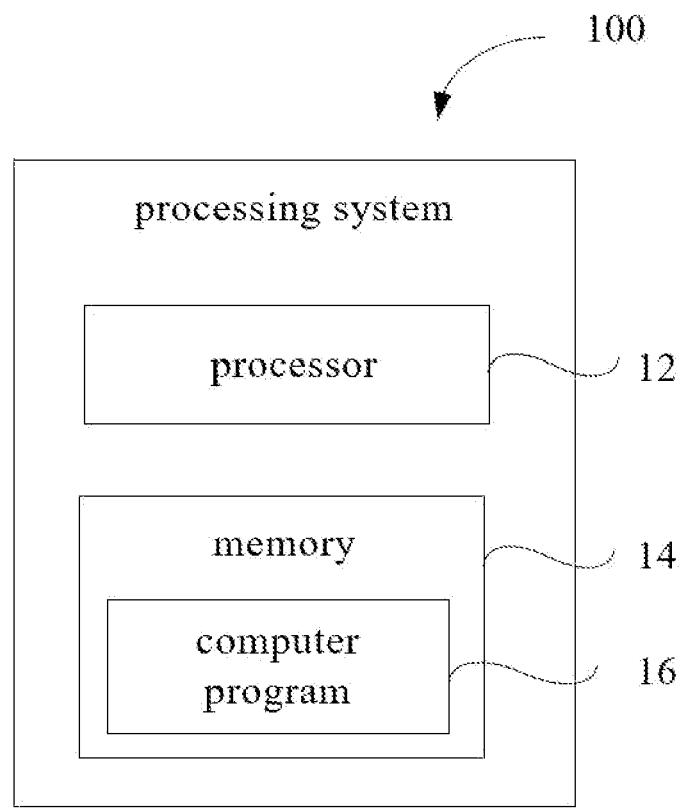
FIG. 2 is a structural diagram of a streaming media data processing system according to some embodiments of the present application.

With reference to FIG. 2, one embodiment of the present application provides a streaming media data processing system 100. The streaming media data processing system 100 includes a processor 12 and a memory 14. The memory 14 stores a computer program 16. The computer program 16 is executed by the processor 12 to implement: receiving streaming media data so as to initialize a storage file and a storage queue according to a header data packet of the streaming media data, and starting a first thread to receive an enqueuing operation; starting a second thread and establishing a message channel to read a streaming media data packet from the storage queue for parsing, and adding the parsed streaming media data packet into the message channel in the form of a message; starting a third thread to read a message from the message channel and encapsulating the message according to preset requirements so as to store the message on a disk; determining a target pull server corresponding to the streaming media data and publishing the streaming media data to the target pull server.

Figure 3:
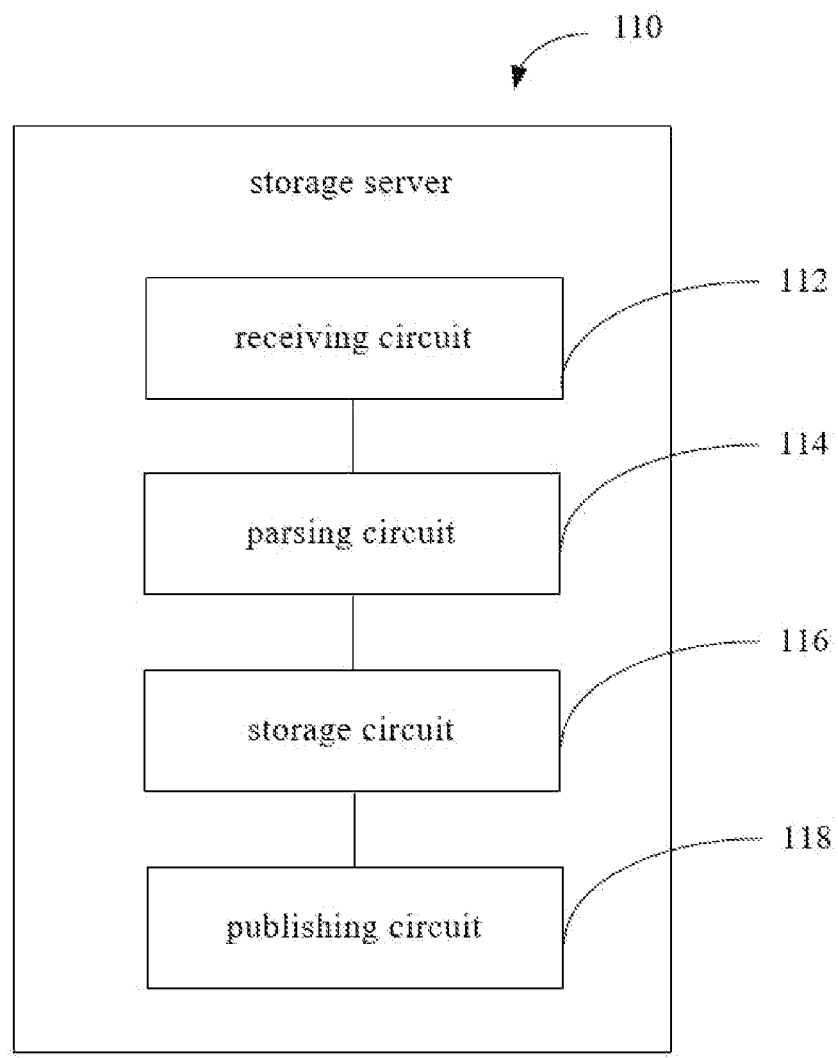
FIG. 3 is a schematic diagram showing modules of a storage server according to some embodiments of the present application.

With reference to FIG. 3, one embodiment of the present application further provides a storage server 110, and the processing method of the embodiments of the present application may be implemented by the storage server 110. The storage server 110 includes a receiving circuit 112, a parsing circuit 114, a storage circuit 116, and a publishing circuit 118. The above step S10 may be implemented by the receiving circuit 112, the above step S20 may be implemented by the parsing circuit 114, the above step S30 may be implemented by the storage circuit 116, and the above step S40 may be implemented by the publishing circuit 118. In other words, the receiving circuit 112 is used for receiving streaming media data so as to initialize a storage file and a storage queue according to a header data packet of the streaming media data; the parsing circuit 114 is used for starting a first thread to receive an enqueuing operation; starting a second thread and establishing a message channel to read a streaming media data packet from the storage queue for parsing, and adding the parsed streaming media data packet into the message channel in the form of a message, and adding the parsed streaming media data packet into the message channel in the form of a message; the storage circuit 116 is used for starting a third thread to read a message from the message channel and encapsulating the message according to preset requirements so as to store the message on a disk; and the publishing circuit 118 is used for determining a target pull server corresponding to the streaming media data and publishing the streaming media data to the target pull server.

Figure 4:
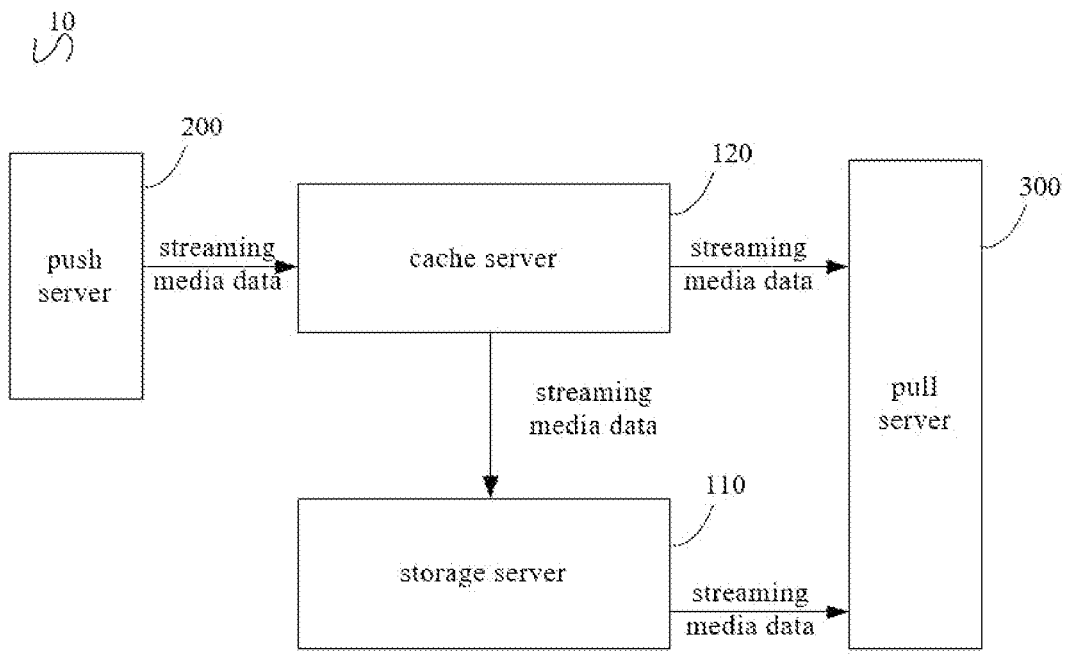
FIG. 4 is a schematic diagram of a streaming media server system according to some embodiments of the present application.

With reference to FIG. 4, one embodiment of the present application provides a streaming media server system 10, includes a push server 200, a storage server 110, a cache server 120 and a pull server 300.

Specifically, when a user clicks to view a live broadcast, streaming media data at a push end is transmitted to a user's playing end in the form of a data packet through the push server 200, the cache server 120, the storage server 110 and the pull server 300. The push server 200 sends the encapsulated streaming media data packet to the cache server 120 according to the streaming media protocol. Since the header data packet in the streaming media data packet defines a protocol type of the streaming media, when the cache server 120 receives the streaming media data packet sent by the push server 200, the storage server 110 can initialize a corresponding storage file according to the header data packet.

For example, if the streaming media protocol type defined by the header data packet is Real Time Messaging Protocol (RTMP), the storage file initialized by the storage server 110 is in H.264 format. For another example, if the streaming media protocol type defined by the header data packet is a Real Time Streaming protocol (RTSP), the storage file initialized by the storage server 110 is a FlashVideo (FLV). For another example, if the streaming media protocol type defined by the header data packet is Http Live Streaming (HLS), the storage file initialized by the storage server 110 is in H.264 format.

Further, the storage server 110 may also initialize the storage queue according to the received header data packet and start the first thread. The first thread may be a thread that receives an enqueuing operation of the streaming media data packet.

Subsequently, the storage server 110 starts the second thread and establishes a message channel with cache. The second thread may be a thread that processes streaming media data. The second thread is responsible for reading streaming media data from the storage queue, parsing the read data, and adding the parsed streaming media data to the message channel in the form of a message. Looping the operations of reading data, parsing the data, adding the data to a message channel can ensure that the second thread runs with a large load and improve data processing efficiency.

At the same time, the storage server 110 starts a third thread. The third thread may be a thread that stores streaming media data. The third thread is responsible for reading the message from the message channel, parsing the read message, encapsulating the message according to the requirements of file formats such as FLU or H.264, and storing the encapsulated data packet to disk. Looping operations of reading data, parsing data, encapsulating data, writing data into a disk can ensure that the third thread runs with a large load, improve data processing efficiency, and realize the dropping of streaming media data to ensure the stable storage of streaming media data.

The second thread and the third thread run independently and do not interfere with each other, so that the reading and dropping of streaming media data can be realized simultaneously, the fluency of video can be improved and the user experience can be improved.

After completing the storage of the streaming media data, the storage server 110 determines a target pull server corresponding to the streaming media data, and publishes the streaming media data to the target pull server. In this way, even with a higher resolution video, streaming media data can be stored and read at a higher speed, so that a user can play clear and smooth videos at the playing end, thereby improving the user experience. At the same time, the streaming media data can be dropped to ensure the stable storage of streaming media data.

In summary, in the streaming media data processing method, the streaming media data processing system 100 and the storage server 110 of the embodiments of the present application, a streaming media data packet is stored via a storage queue, and the streaming media data packet is dropped via a message channel, which can ensure that the streaming media data is stored and read at a higher speed, and when a streaming media file is played, a smoother and clearer playing effect is achieved, improving user experience.

Figure 5:
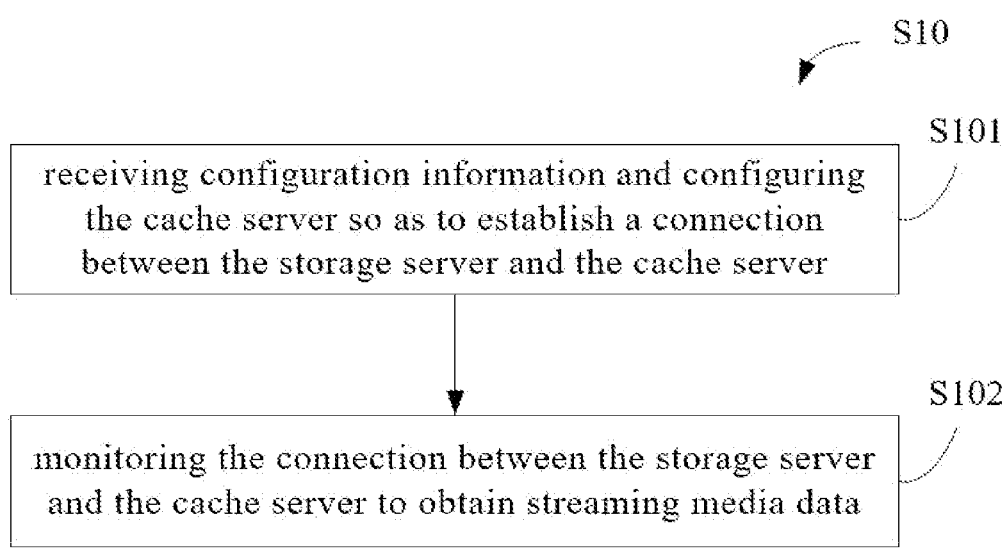
FIG. 5 is a flow diagram of a streaming media data processing method according to some embodiments of the present application.

With reference to FIG. 5, in some embodiments, the above step S10 may further include:

S101: receiving configuration information and configuring the cache server 120 so as to establish a connection between the storage server 110 and the cache server 120; and S102: monitoring the connection between the storage server 110 and the cache server 120 to obtain streaming media data.

In some embodiments, S101 and S102 may be implemented by the receiving circuit 112. In other words, the receiving circuit 112 is used for receiving configuration information and configuring the cache server 120 to establish a connection between the storage server 110 and the cache server 120, and for monitoring the connection between the storage server 110 and the cache server 120 to obtain streaming media data.

In some embodiments, the processor 12 is used for receiving configuration information and configuring the cache server 120 to establish a connection between the storage server 110 and the cache server 120, and for monitoring the connection between the storage server 110 and the cache server 120 to obtain streaming media data.

Specifically, the cache server 120 may be configured by receiving configuration information through the REST interface of the storage server 110, and a connection between the storage server 110 and the cache server 120 may be established. After the connection between the storage server 110 and the cache server 120 is established, the connection is monitored so that when new streaming media data is published, the cache server 120 can send encapsulated streaming media data packets to the storage server 110.

The storage server 110 receives a streaming media data packet sent by the cache server 120, initializes a storage file and a storage queue according to a header data packet of the streaming media data, and starts a first thread to receive an enqueuing operation of the streaming media data packet, starts a second thread, establishes a message channel and starts a third thread; the second thread loops the operations of reading data, parsing data, and adding the data to the message channel; and the third thread loops the operations of reading data, parsing data, encapsulating data, and writing the data into a disk. Therefore, it can be ensured that the second thread and the third thread run with a large load, thereby improving the data processing efficiency and realizing the falling of streaming media data, and ensuring the stable storage of streaming media data.

In some embodiments, the configuration information includes: address information, protocol type information, and key information.

Specifically, the address information is used to look up the cache server 120 and establish a connection between the storage server 110 and the cache server 120. The protocol type information is used to identify a storage format of the streaming media file and confirm a communication rule between the cache server 120 and the storage server 110. The key information is used for authentication between the cache server 120 and the storage server 110, and ensuring communication security and communication secrecy of the two.

With reference to FIG. 6, in some embodiment, the step S10 includes:

S103: defining a storage queue and buffering the streaming media data packet according to a time sequence.

In some embodiments, S103 may be implemented by the receiving circuit 112. In other words, the receiving circuit 112 is used for defining a storage queue and buffering the streaming media packet in a time sequence.

In some embodiments, the processor 12 is used for defining a storage queue and buffering the streaming media data packet according to a time sequence.

Specifically, when receiving a streaming media data packet, the storage server 110 reads and parses the data packet to obtain stream description information, such as an identification number, a name, a protocol type and a time stamp of the streaming media data. The storage server 110 encapsulates the stream description information into a header data packet, sends the header data packet to the cache server 120, and defines and initializes a storage queue according to the header data packet in preparation for subsequent enqueuing and dequeuing operations.

Subsequently, the storage server 110 encapsulates the data such as the identification number, the packet sequence number, the time stamp and data load of the parsed streaming media data into one or more streaming media data packets. The first thread buffers the streaming media data packets sequentially in a time sequence through the storage queue. The second thread reads the streaming media data from the storage queue, parses the read data, and adds the parsed streaming media data to the message channel in the form of a message. The third thread reads the message from the message channel, parses the read message, encapsulates the message according to the requirements of file formats such as FLU or H.264, and stores the encapsulated data packet to disk.

In this way, it is ensured that the first thread, the second thread and the third thread run with a large load, thereby improving data processing efficiency and achieving the dropping of streaming media data and ensuring the stable storage of streaming media data.

Further, the enqueuing and dequeuing operations of streaming data packet may be atomic operations. The atomic operation will not have thread switching when running, thereby ensuring the time sequence of streaming media data packet enqueuing and dequeuing while ensuring the high efficiency of data transmission, achieving a smoother and clearer playing effect and improving user experience.

With reference to FIG. 7, in some embodiments, the above step S40 includes:

S401: establishing a connection between the storage server 110 and the pull server 300 according to a protocol supported by the pull server 300 and registering the pull server 300;

S402: determining a target pull server corresponding to streaming media data according to registration information of the streaming server 300;

S403: publishing streaming media data to the target pull server.

In some embodiments, the steps S401-S403 described above may be implemented by the publishing circuit 116. In other words, the publishing circuit 116 is used for establishing a connection between the storage server 110 and the pull server 300 according to the protocol supported by the pull server 300 and registering the pull server 300, determining a target pull server corresponding to the streaming media data according to the registration information of the pull server 300, and publishing the streaming media data to the target pull server.

In some embodiments, the processor 12 is used for establishing a connection between the storage server 110 and the pull server 300 according to the protocol supported by the pull server 300 and registering the pull server 300, determining a target pull server corresponding to the streaming media data according to the registration information of the pull server 300, and publishing the streaming media data to the target pull server.

Specifically, the storage server 110 establishes a connection with the pull server 300 according to a protocol supported by the pull server 300, such as RTMP, RTSP, HLS, and registers the pull server 300 in the storage server 110. When publishing the streaming media data, the cache server 120 determines a target pull server corresponding to the streaming media data according to the registration information of the pull server 300, and publishes the streaming media data to the target pull server.

Thus, it enables the storage server 110 to uniformly manage the connection of the pull service, simultaneously process pull requests of multiple pull servers 300, and reduce the delay rate of data transmission.

Figure 8:
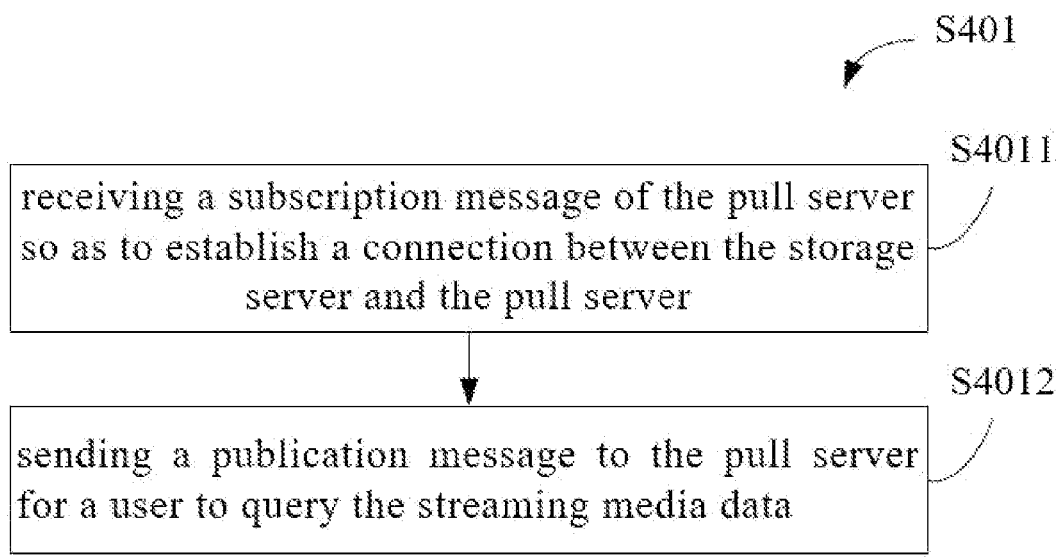
FIG. 8 is a flow diagram of a streaming media data processing method according to some embodiments of the present application.

With reference to FIG. 8, in some embodiments, the above step S401 include:

S4011: receiving a subscription message of the pull server 300 so as to establish a connection between the storage server 110 and the pull server 300; and S4012: sending a publication message to the pull server 300 for a user to query the streaming media data.

In some embodiments, the steps S4011 and S4012 described above may be implemented by the publishing circuit 116. In other words, the publishing circuit 116 is used for receiving a subscription message of the pull server 300 so as to establish a connection between the storage server 110 and the pull server 300, and for sending a publication message to the streaming server 300 for a user to query the streaming media data.

In some embodiments, the processor 12 is used for receiving a subscription message of the pull server 300 so as to establish a connection between the storage server 110 and the pull server 300, and for sending a publication message to the streaming server 300 for a user to query the streaming media data.

Specifically, the storage server 110 unifies a data subscription and data publication interface so that a plurality of pull servers 300 can each subscribe to streaming media data from the storage server 110 after registering in the storage server 110. When the pull server 300 subscribes to streaming media data from the storage server 110, the storage server 110 receives a subscription message of the pull server 300 and establishes a connection between the storage server 110 and the pull server 300. When publishing the streaming media data, the storage server 110 starts a first thread, a second thread and a third thread, and sends a publication message to the pull server 300 for a user to query the streaming media data at the pull end.

In some embodiments, the storage server 110 establishes a connection between the storage server 110 and the pull server 300 according to a protocol supported by the pull server 300, and registers the pull server 300. When a user watches a video, the pull server 300 sends a subscription message to the storage server 110, and waits for the storage server 110 to send a publication message. When receiving the publication message, the pull server 300 parses the publication message and synchronizes the publication message to a corresponding REST interface for a user to consult.

In addition, if a user requests a certain streaming media file which has been stored in the storage server 110, the pull server 300 sends a message of subscribing to a specified streaming media data identification number to the storage server 110, and after receiving the subscription message, the storage server 110 reads corresponding streaming media data according to the streaming media data identification number and sends the corresponding streaming media data to the pull server 300.

In some embodiments, the subscription message and/or the publication message are sent as an object profile string via a transmission control protocol, where the subscription message includes a streaming media data identification number, a streaming media protocol, a streaming media name and a time stamp, and the publication message includes the streaming media data identification number, the streaming media protocol, the streaming media name, the time stamp, the packet sequence number of the streaming media data packet and a streaming media data load.

In particular, the subscription message and/or the publication message may be sent as the JavaScript Object Notation (JSON) strings via a transmission control protocol. The hierarchical structure of JSON strings is concise and clear, easy to understand and read, and the network transmission efficiency on the machine end is high. Using JSON strings to write messages and transmit messages can improve the research and development efficiency of the streaming media server system and the data transmission efficiency in the usage process of the system.

Further, the pull server 300 sends a subscription message to the storage server 110, and the subscription message includes a streaming media data identification number, a streaming media protocol, a streaming media name and a time stamp. The streaming media data identification number is used for identifying a specific streaming media resource. The streaming media protocol is used for defining a communication rule between the pull server 300 and the storage server 110. The streaming media name may be a name of a streaming media resource subscribed by a user. The time stamp is used for realizing synchronization of video playing and audio playing.

The storage server 110 sends a publication message to the pull server 300, and the publication message includes a streaming media data identification number, a streaming media protocol, a streaming media name, a time stamp, a packet sequence number of a streaming media data packet and a streaming media data load. The packet sequence number of the streaming media data packet and the streaming media data load only exist in the publication message. The packet sequence number is used for ordering one or more streaming media data packets in a storage queue to ensure the timing of streaming media data packet enqueuing and dequeuing. The streaming media data load may be valid information in a streaming media data packet.

Figure 9:
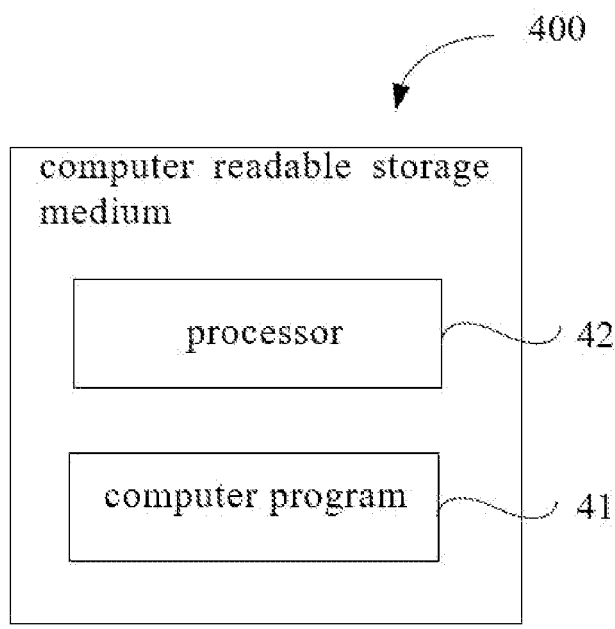
FIG. 9 is a structural diagram of a computer readable storage medium according to some embodiments of the present application.

With reference to FIG. 9, one embodiment of the present application further provides a non-transitory computer readable storage medium 400 having stored thereon a computer program 41. The computer program 41 is executed by one or more processors 42 to implement the streaming media data processing method of any of the embodiments described above.

It will be appreciated by those of ordinary skill in the art that all or part of the flow of the methods of the embodiments described above may be implemented by instructing associated hardware by a computer program, which may be stored on a non-transitory computer readable storage medium. The computer program is executed to implement the flow of the embodiments of the methods described above. The storage medium may be a magnetic disk, an optical disk, a Read-Only Memory (ROM), etc.

The above embodiments, which represent only a few implementations of the present application, are described in more detail but are not to be construed as limiting the scope of the present application. It should be noted that a person skilled in the art would have been able to make several variations and modifications without departing from the concept of the present application, which falls within the scope of the present application. Accordingly, the scope of the present application is as set forth in the claims.

What is claimed is:

1. A streaming media data processing method, comprising:
  receiving streaming media data, initializing a storage file and a storage queue according to a header data packet of the streaming media data, and starting a first thread to receive an enqueuing operation;
  starting a second thread and establishing a message channel so as to read a streaming media data packet from the storage queue for parsing, and adding the parsed streaming media data packet into the message channel in the form of a message;
  starting a third thread to read the message from the message channel and encapsulating the message according to preset requirements so as to store the message on a disk; and
  determining a target pull server corresponding to the streaming media data and publishing the streaming media data to the target pull server.

2. The processing method according to claim 1, wherein the receiving streaming media data, initializing a storage file and a storage queue according to a header data packet of the streaming media data, and starting a first thread to receive an enqueuing operation, comprises:
  receiving configuration information and configuring a cache server so as to establish a connection between a storage server and the cache server; and
  monitoring the connection between the storage server and the cache server to obtain the streaming media data.

3. The processing method according to claim 2, wherein the configuration information comprises: address, protocol type, and key.

4. The processing method according to claim 1, wherein the receiving streaming media data, initializing a storage file and a storage queue according to a header data packet of the streaming media data, and starting a first thread to receive an enqueuing operation, comprises:
  defining the storage queue and buffering the streaming media data packet according to a time sequence; the storage queue supporting enqueuing and dequeuing operations; the streaming media data packet comprising a packet sequence number, a time stamp and a data load; the header data packet comprising stream description information.

5. The processing method according to claim 1, wherein the determining a target pull server corresponding to the streaming media data and publishing the streaming media data to the target pull server, comprises:
  establishing a connection between a storage server and a pull server according to a protocol supported by the pull server and registering the pull server;

determining the target streaming server corresponding to the streaming media data according to registration information of the pull server; and
publishing the streaming media data to the target pull server.

6. The processing method according to claim 5, wherein the establishing a connection between a storage server and a pull server according to a protocol supported by the pull server and registering the pull server, comprises:
receiving a subscription message of the pull server so as to establish a connection between the storage server and the pull server; and
sending a publication message to the pull server for a user to query the streaming media data.

7. The processing method according to claim 6, wherein the subscription message and/or the publication message are sent as an object profile string via a transmission control protocol, wherein the subscription message comprises a streaming media resource identification number, a streaming media protocol, a streaming media name and a time stamp, and the publication message comprises the streaming media resource identification number, the streaming media protocol, the streaming media name, the time stamp, the packet sequence number of the streaming media data packet and a streaming media data load.

8. A non-transitory computer readable storage medium storing a computer program, wherein the computer program is executed by one or more processors to implement the steps of the streaming media data processing method according to claim 1.

9. The non-transitory computer readable storage medium according to claim 8, wherein the computer program is executed by one or more processors to implement:
receiving configuration information and configuring a cache server so as to establish a connection between a storage server and the cache server; and
monitoring the connection between the storage server and the cache server to obtain the streaming media data.

10. The non-transitory computer readable storage medium according to claim 9, wherein the configuration information comprises: address, protocol type, and key.

11. The non-transitory computer readable storage medium according to claim 8, wherein the computer program is executed by one or more processors to implement:
defining the storage queue and buffering the streaming media data packet according to a time sequence; the storage queue supporting enqueuing and dequeuing operations; the streaming media data packet comprising a packet sequence number, a time stamp and a data load; the header data packet comprising stream description information.

12. The non-transitory computer readable storage medium according to claim 8, wherein the computer program is executed by one or more processors to implement:
establishing a connection between a storage server and a pull server according to a protocol supported by the pull server and registering the pull server;
determining the target streaming server corresponding to the streaming media data according to registration information of the pull server; and
publishing the streaming media data to the target pull server.

13. A storage server, comprising:
a receiving circuit configured to receive streaming media data, initialize a storage file and a storage queue according to a header data packet of the streaming media data, and start a first thread to receive an enqueuing operation;
a parsing circuit configured to start a second thread and establish a message channel so as to read a streaming media data packet from the storage queue for parsing, and add the parsed streaming media data packet into the message channel in the form of a message;
a storage circuit configured to start a third thread to read the message from the message channel and encapsulate the message according to preset requirements so as to store the message on a disk; and
a publishing circuit configured to determine a target pull server corresponding to the streaming media data and publish the streaming media data to the target pull server.

14. A streaming media data processing system, comprising: one or more processors and a memory, the memory storing a computer program, wherein the computer program is executed by the processors to implement:
receiving streaming media data, initializing a storage file and a storage queue according to a header data packet of the streaming media data, and starting a first thread to receive an enqueuing operation;
starting a second thread and establishing a message channel so as to read a streaming media data packet from the storage queue for parsing, and adding the parsed streaming media data packet into the message channel in the form of a message;
starting a third thread to read the message from the message channel and encapsulating the message according to preset requirements so as to store the message on a disk; and
determining a target pull server corresponding to the streaming media data and publishing the streaming media data to the target pull server.

15. The processing system according to claim 14, wherein the computer program is executed by the processors to implement:
receiving configuration information and configuring a cache server so as to establish a connection between a storage server and the cache server; and
monitoring the connection between the storage server and the cache server to obtain the streaming media data.

16. The processing system according to claim 15, wherein the configuration information comprises: address, protocol type, and key.

17. The processing system according to claim 14, wherein the computer program is executed by the processors to implement:
defining the storage queue and buffering the streaming media data packet according to a time sequence; the storage queue supporting enqueuing and dequeuing operations; the streaming media data packet comprising a packet sequence number, a time stamp and a data load; the header data packet comprising stream description information.

18. The processing system according to claim 14, wherein the computer program is executed by the processors to implement:
establishing a connection between a storage server and a pull server according to a protocol supported by the pull server and registering the pull server;
determining the target pull server corresponding to the streaming media data according to registration information of the pull server; and publishing the streaming media data to the target pull server.

19. The processing system according to claim 18, wherein the computer program is executed by the processors to implement:

receiving a subscription message of the pull server so as to establish a connection between the storage server and the pull server; and sending a publication message to the pull server for a user to query the streaming media data.

20. The processing system according to claim 19, wherein the subscription message and/or the publication message are sent as an object profile string via a transmission control protocol, wherein the subscription message comprises a streaming media resource identification number, a streaming media protocol, a streaming media name and a time stamp, and the publication message comprises the streaming media resource identification number, the streaming media protocol, the streaming media name, the time stamp, the packet sequence number of the streaming media data packet and a streaming media data load.

\* \* \* \* \*